United States Patent [19]

Nakayama et al.

[11] Patent Number: 5,035,682
[45] Date of Patent: Jul. 30, 1991

[54] AUTOMOTIVE TRANSMISSION APPARATUS

[75] Inventors: Hiroshi Nakayama; Hiroyuki Shimada; Toshiyuki Yumoto, all of Saitama, Japan

[73] Assignee: Honda Giken Kogyo Kabushiki Kaisha, Tokyo, Japan

[21] Appl. No.: 483,957

[22] Filed: Feb. 9, 1990

Related U.S. Application Data

[63] Continuation of Ser. No. 199,474, May 27, 1988, abandoned.

[30] Foreign Application Priority Data

| May 27, 1987 [JP] | Japan | 62-128464 |
| May 27, 1987 [JP] | Japan | 62-128465 |

[51] Int. Cl.$^5$ .................................................. F16H 3/08
[52] U.S. Cl. ...................................... 475/66; 475/200; 74/360
[58] Field of Search ............... 74/331, 333, 357, 359, 74/360, 361; 475/66, 67, 200, 206

[56] References Cited

U.S. PATENT DOCUMENTS

| 2,558,656 | 6/1951 | Lapsley | 74/360 X |
| 2,972,901 | 2/1961 | Gerst | 74/331 X |
| 3,858,455 | 1/1975 | Sisson et al. | 74/331 X |
| 4,056,988 | 11/1977 | Kubo et al. | 475/66 |
| 4,063,464 | 12/1977 | Crabb | 74/331 |
| 4,258,587 | 3/1981 | Morino | 475/200 |
| 4,341,127 | 7/1982 | Stodt | 74/333 |
| 4,377,093 | 3/1983 | Janson | 74/359 X |
| 4,392,391 | 7/1983 | Jameson et al. | 74/331 X |
| 4,488,457 | 12/1984 | Nishimura et al. | 74/868 |
| 4,658,661 | 4/1987 | Terashita | 74/331 |
| 4,662,242 | 5/1987 | Atkinson et al. | 74/701 |
| 4,676,116 | 6/1987 | Nerstad et al. | 74/360 |
| 4,677,874 | 7/1987 | Friedrich | 74/331 X |
| 4,833,943 | 5/1989 | Bucksch | 74/701 |

FOREIGN PATENT DOCUMENTS 2064011 6/1981 United Kingdom .
3620250 12/1987 Fed. Rep. of Germany ............ 206/

Primary Examiner—Dirk Wright
Attorney, Agent, or Firm—Lyon & Lyon

[57] ABSTRACT

An automotive transmission includes an input shaft coupled to a torque converter or a clutch, an output shaft disposed parallel to the input shaft for driving a differential and transmission gear trains disposed between the input and output shafts. The first and second countershafts are disposed between the input and output shafts with an auxiliary transmission gear train connecting the input shaft and the first countershaft. The first and second countershafts are connected by normally meshing gears. A main transmission gear train with multiple gear ratios connects the second countershaft to the output shaft. A portion of the main transmission gear train is positioned adjacent the torque converter or the clutch to produce a compact arrangement.

16 Claims, 5 Drawing Sheets

AUTOMOTIVE TRANSMISSION APPARATUS

This is a continuation of co-pending application Ser. No. 199,474, filed on May 27, 1988, now abandoned.

The present invention relates to an improvement in a transmission gear train in an automatic automotive transmission.

As disclosed in Japanese Laid-Open Patent Publication No. 58-99543, conventional automotive transmissions generally have an input shaft directly connected to a torque converter and an output shaft with the input and output shafts being disposed parallel to each other behind the torque converter and a transmission gear train for three or four gear ratios disposed between the input and output shafts. In manual transmissions having clutches instead of torque converters, the shafts and gear train are similarly arranged.

If more gear ratios are added, the shaft lengths are increased and the shafts become easily flexed thereby resulting in noise caused by the meshing gears. Since the length of the transmission would be increased, it would be difficult to house the transmission as directly coupled to the engine in an engine compartment. Where an engine is placed transversely in an automotive, if a transmission is too long, the outer end of its output shaft extends beyond the center of the automobile body and hence a differential for driving the front wheels cannot be positioned on the central line of the vehicle body. Therefore, the lengths of the two axles for the front wheels will not be equal, which is undesirable.

According to the present invention, the above problems can be solved by dividing the transmission gears into main and auxiliary transmission gear trains, and arranging the main transmission gear train laterally of a torque converter. More specifically, there is provided an automotive transmission including an input shaft coupled to and disposed behind a torque converter or a clutch, an output shaft disposed parallel to the input shaft for driving a differential, transmission gear trains disposed between the input and output shafts, first and second countershafts disposed between the input and output shafts, an auxiliary transmission gear train between the input shaft and the first countershaft, the first and second countershafts being coupled to each other by normally meshing gears, and a main transmission gear train mounted on the second countershaft and the output shaft with the main transmission gear train having a portion projecting from the torque converter or the clutch toward an engine. Power is transmitted through the auxiliary transmission gear train and the main transmission gear train for driving the differential which may be disposed substantially at the center of the automobile body.

In one embodiment of this invention, an integral front case houses the torque converter or clutch and the auxiliary transmission while a separate case houses the main transmission gear trains and is bolted to the front case.

The preferred embodiments of the present invention will hereinafter be described with reference to the drawings, wherein.

Figure 1:
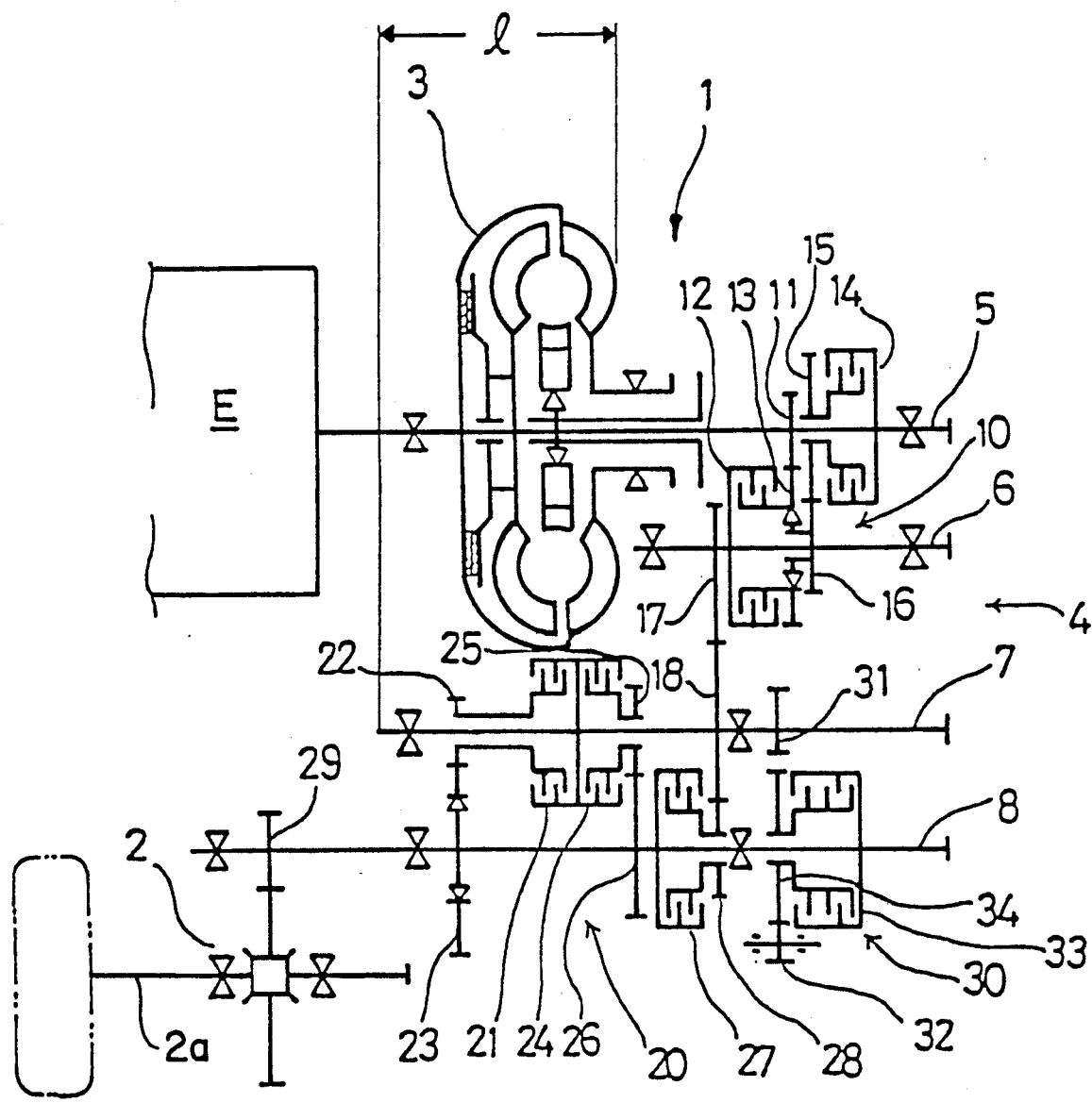
FIG. 1 is a diagrammatic view of an automatic transmission of the present invention.

Referring now to FIG. 1, an automotive transmission 1 according to the present invention is shown with a torque converter 3 and a differential 2. The automatic transmission 1 comprises a torque converter 3 and a gear transmission 4 with the torque converter 3 being directly coupled to an engine E. The gear transmission 4 has four shafts, i.e., an input shaft 5 coupled to the torque converter 3, a first countershaft 6, a second countershaft 7, and an output shaft 8 which are parallel to each other. These shafts are supported in a transmission case (not shown) in the usual manner.

The input shaft 5 and the first countershaft 6 support an auxiliary transmission gear train 10 including a low-speed gear ratio having a low-speed gear 11 fixed to the input shaft 5 and a gear 13 on a low-speed clutch 12 on the first countershaft 6, and a high-speed gear ratio having a gear 15 on a high-speed clutch 14 on the input shaft 5 and a high-speed gear 16 fixed to the first countershaft 6. The auxiliary transmission gear train 10 enables an output gear 17 on the first countershaft 6 to drive an input gear 18 on the second countershaft 7 selectively at either of the two gear ratios.

A main transmission gear train 20 comprises a first-speed gear train including a gear 22 on a first-speed clutch 21 on the second countershaft 8 and a first-speed gear 23 fixedly mounted on the output shaft 8, a second-speed gear train including a gear 25 on a second-speed clutch 24 on the second countershaft 7 and a second-speed gear 26 fixedly mounted on the output shaft 8, and a third-speed gear train including the input gear 18 and a third-speed gear 28 on a third-speed clutch 27 on the output shaft 8.

Therefore, the output shaft 8 can be rotated by the main and auxiliary transmission gear trains selectively in a total of six forward gear ratios to drive the differential 2 through a pinion 29 to drive the axles 2a.

A reverse gear train 30 comprises a reverse drive gear 31 on the second countershaft 7, an intermediate gear 32 on its own shaft (unnumbered), and a reverse gear 34 on a clutch 33 mounted on the output shaft 8. The output shaft 8 can be rotated in a reverse direction by the reverse gear train 30 selectively at two reverse speeds which are selectable by the auxiliary transmission gear train 10.

The main transmission gear train 20 is disposed laterally of the torque converter 3 and has one end projecting a distance L from an end of the torque converter 3 toward the engine E.

With this arrangement, the second countershaft 7 and the output shaft 8 can be positioned in a location radially spaced from the input shaft 5 because of the presence of the output gear 17 on the first countershaft 6 and the input gear 18 on the second countershaft 7. Since these shafts 7, 8 are no longer than the input shaft 5 by a length substantially equal to the length of the torque converter 3, the shafts 7, 8 can support the main transmission gear train and the reverse gear train which have many components. The main transmission gear train 20 is arranged along the torque converter 3 and has a portion projecting toward the engine E. Therefore, the second countershaft 7 and the output shaft 8 can be arranged without projecting beyond the rear end of the input shaft 5 whereby the transmission may be short.

Figure 2:
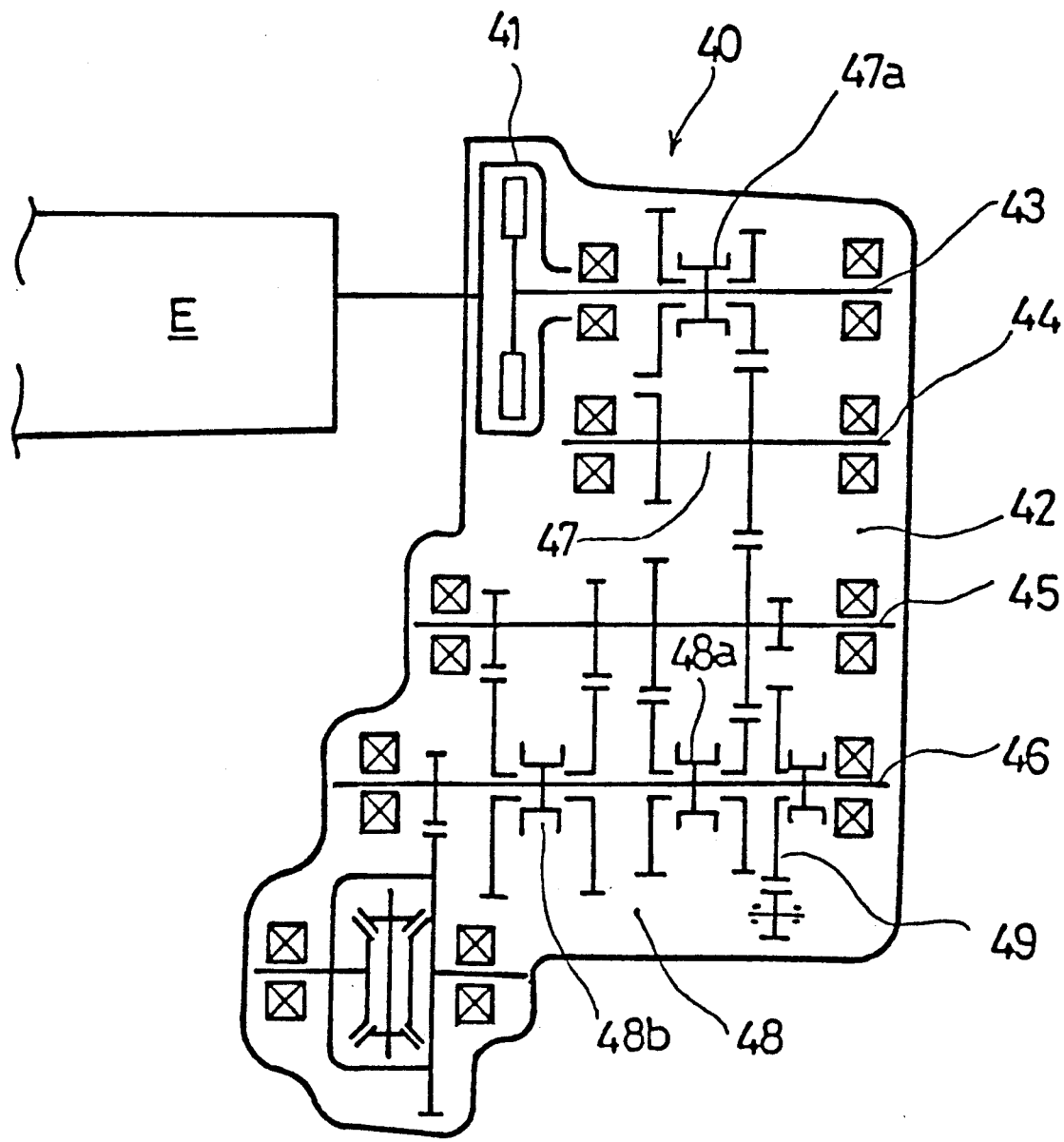
FIG. 2 is a diagrammatic view of a manual transmission of the present invention.

Another embodiment of the present invention will be described with reference to FIG. 2. An automotive transmission 40 comprises a clutch 41 and a manually operated transmission 42. The transmission 42 includes an input shaft 43, a first countershaft 44, a second countershaft 45, and an output shaft 46. The input shaft 43 and the first countershaft 44 support an auxiliary transmission gear train 47, and the second countershaft 45 and the output shaft 46 support a main transmission gear train 48 and a reverse gear train 49.

The auxiliary transmission gear train 47 can selectively connect and disconnect two gear trains with a synchro clutch 47a, and the main transmission gear train 48 can selectively connect and disconnect two pairs of gear trains each with one of two synchro clutches 48a, 48b. Therefore, the output shaft 46 can be rotated selectively at eight forward speeds. The output shaft 46 can also be rotated selectively at two reverse speeds by the reverse gear train 49 and the synchro clutch 47a.

In the transmission 40, the main transmission gear train 48 is arranged along the side of the clutch 41 and has a portion projecting toward the engine E. The second countershaft 45 and the output shaft 46 are positioned without projecting beyond the rear end of the input shaft 5. Accordingly, the transmission apparatus 40 is short.

With the present invention, as described above, since the axial length of the transmission is shorter than that of a two-shaft transmission, the transmission is of increased flexural rigidity, the noise arising from meshing gears is reduced and an increased number of gear ratios may be included. Inasmuch as the transmission apparatus including the torque converter or the clutch is short in overall length, the differential may be placed substantially at the center of the automobile body, and the difference between the lengths of lateral drive shafts or axles may be reduced or eliminated.

Figure 3:
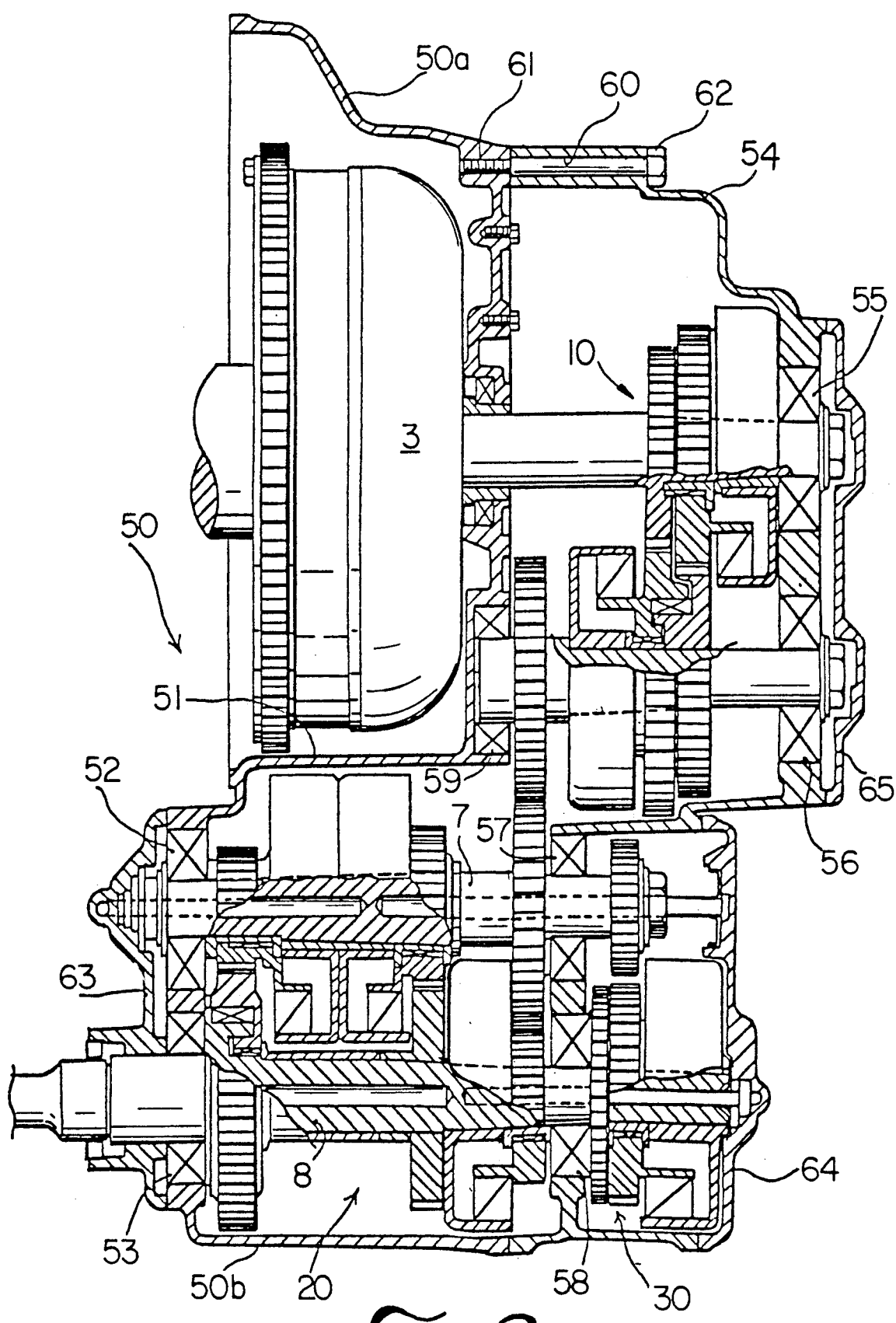
FIG. 3 is a vertical cross-section of an automotive transmission of the present invention taken substantially on line III13 III of FIG. 4.

As a further improvement by the present invention, the transmission case may be constructed in an effective and simplified manner. The automatic transmission 1 of FIG. 1 is shown in FIG. 3 but the same principles apply to the manual transmission of FIG. 2. The transmission is disposed in a case assembly shown in FIG. 3 including a front case with a torque converter case 50a for protecting the torque converter 3, and an auxiliary transmission case 50b. The cases 50a, 50b are integrally cast and coupled to each other by a common partition 51. The second countershaft 7 and the output shaft 8 are supported in the auxiliary transmission case 50b by bearings 52, 53, the auxiliary transmission case 50b housing the main transmission gear train 20.

A main transmission case 54 supports the input shaft 5, the first countershaft 6, the second countershaft 7, and the output shaft 8 with bearings 55, 56, 56, 58 and a bearing 59 in the torque converter case 50a, and also houses the auxiliary gear train 10 and the reverse gear train 30.

The main transmission case 54 is fastened to the front case 50 by means of bolts 62 passing through holes 60 defined in an outer periphery of the case 54 threadedly into threaded holes 61 defined in the front case 50. End openings of the cases are closed off by covers 63, 64, 65.

If the auxiliary transmission case 50b were formed separately from the torque converter case 50a and subsequently coupled to the main transmission case 54, the resultant transmission case would be of an L shape, and the auxiliary transmission case 50b would project from the main transmission case 54 in a cantilevered fashion and hence would be of reduced rigidity. An auxiliary transmission case 50b of such a construction having reduced rigidity which supports the output shaft 8 for transmitting high torque would easily be flexed under lateral pressure exerted by the output shaft 8.

According to this aspect of the present invention, however, the auxiliary transmission case 50a and the torque converter 3 are integrally cast as the front case 50 of a unitary structure. The front case 50 has a large cross-sectional area and is reinforced with the partition 51. Therefore, the front case 50 is high in overall rigidity to reduce the amount of flexing of the auxiliary transmission case 50b.

Figure 4:
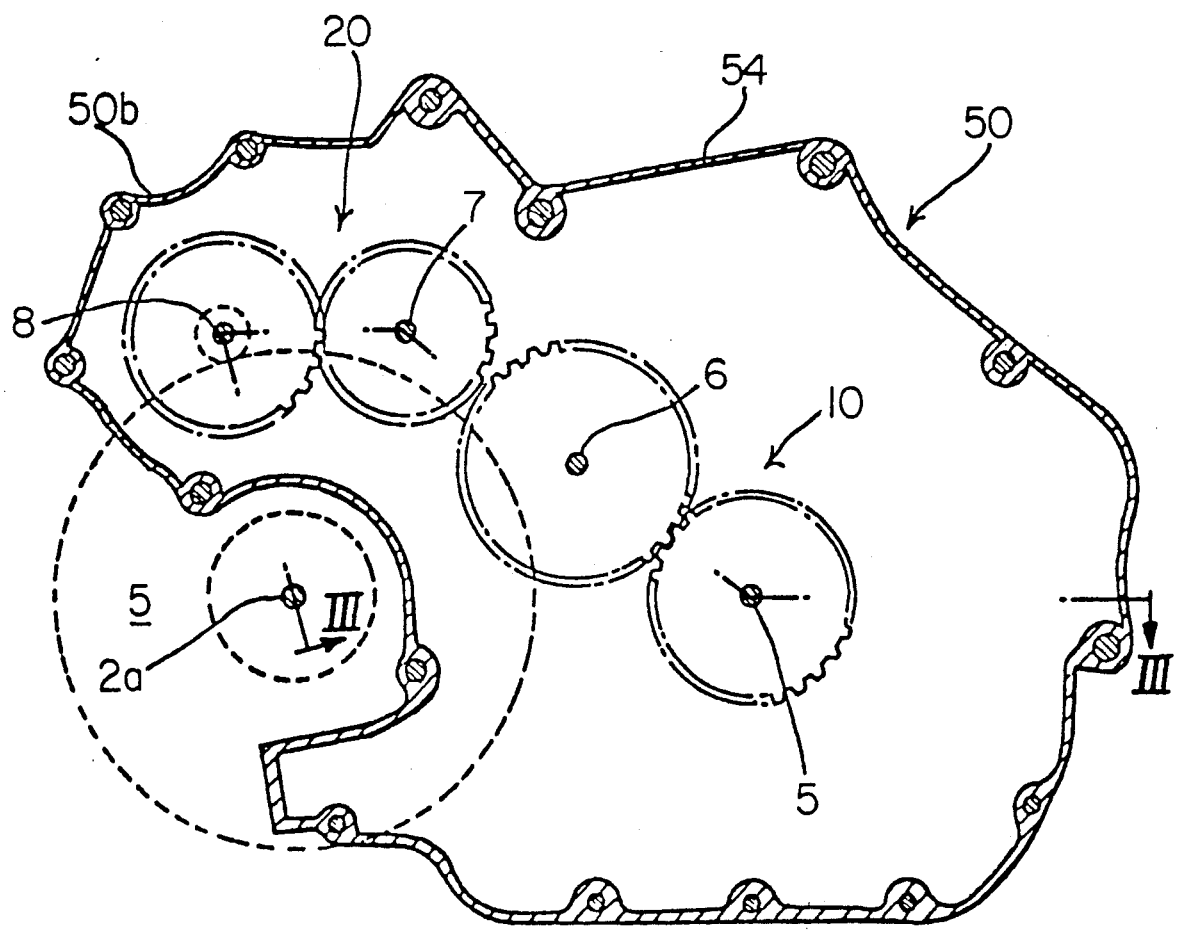
FIG. 4 is a sectional end view of the automotive transmission illustrated in FIG. 3.

Referring now to FIG. 4, a preferred arrangement of the shafts of the transmission is shown. The output shaft 8 and the second countershaft 7 are positioned on the same horizontal plane behind the input shaft 5 obliquely upwardly thereof. The first countershaft 6 is positioned on a plane interconnecting the input shaft 5 and the second countershaft 7. A rear portion 50b of the transmission case 54 which stores the main transmission gear train 20 including the output shaft 8 and the second countershaft 7 is offset upwardly with a lower space 5 defined below the rear portion 50b.

With the above arrangement, the differential 2 is disposed closely to the engine in the longitudinal direction of the vehicle in overlapping relating to the transmission case 50 in order to position the axles 2a in the lower space 5. Thus, the dimension of the entire transmission 1 in the longitudinal direction of the vehicle is reduced, allowing the space around the engine to be effectively utilized. The first and second countershafts 6, 7 are disposed upwardly of the input shaft 5 and the gears and clutches on the output shaft 8 are not immersed in an oil pool at the bottom of the transmission case 50, and hence are not subject to resistance which would otherwise be developed by the stirred oil.

Figure 5:
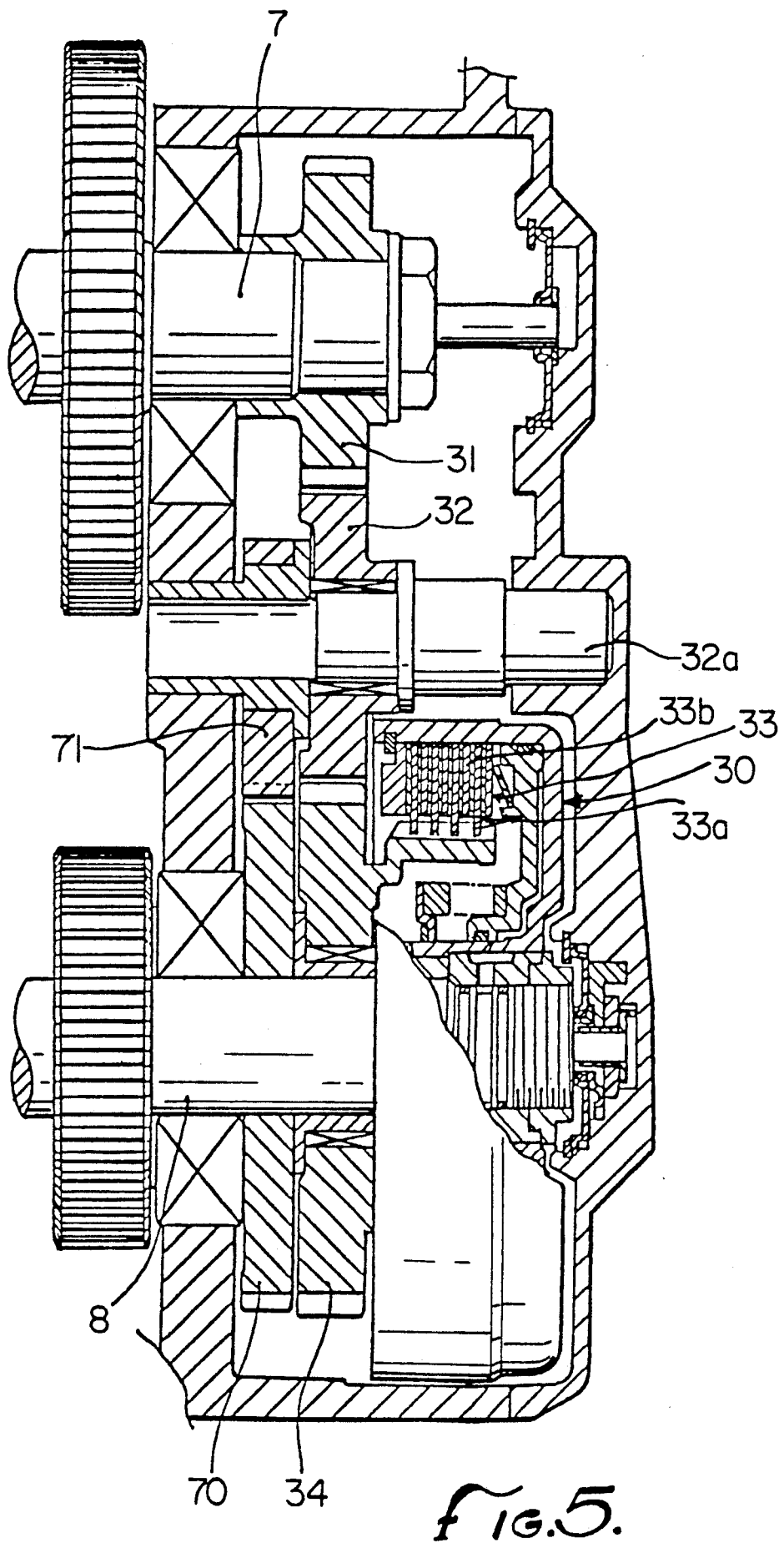
FIG. 5 is a vertical cross-section similar to FIG. 3 of a modified form of a portion of the automotive transmission.

A still further improvement in the transmission of the present invention involves the specific arrangement of the reverse gear train as shown in FIG. 5. As noted above, the main transmission gear train 20 has a reverse gear train 30 stored in an end of the transmission case 54 where a portion of the transmission case which stores the main transmission gear train 20 and a portion of the transmission case 3 which stores the auxiliary transmission gear train 10 are axially overlapped. The reverse gear train 30 includes a reverse driver gear 31 fixed to the second countershaft 7 and meshing with a reverse driven gear 34 rotatably supported on the output shaft 8 through an idle gear 32 rotatably supported on an idle shaft 32a disposed between the second countershaft 7 and the output shaft 8. The reverse driven gear 34 and the output shaft 8 can be engaged through a reverse hydraulic clutch 33 on the output shaft 8. Rotative power applied to the second countershaft 7 in one direction is supplied to the output shaft 8 in the opposite direction through idle gear 32.

The reverse hydraulic clutch 33 comprises a multiple-disc clutch including a plurality of inner discs 33a fixed to the reverse driven gear 34 and a plurality of outer discs 33b fixed by an outer member to output shaft 8. Rotation of the reverse driven gear 34 is transmitted to the output shaft 8 through frictional forces between the inner and outer discs 33a, 33b. Denoted at 70 is a parking gear and 71 a parking pawl for engaging the parking gear 70.

In operation, when the inner and outer discs 33a, 33b are brought into engagement, the reverse gear train 30 is established to move the vehicle backwards. When the inner and outer discs 33a, 33b are disengaged, the reverse gear train 30 is disconnected, thereby allowing the vehicle to move forwardly. At such time, the inner discs 33a rotate in the opposite direction with the second countershaft 7, whereas the outer discs 33b fixed to the output shaft 8 rotate in the normal direction, with dragging resistance developed between the inner and outer discs 33a, 33b. Since, however, the rotational speed of the inner discs 33a is reduced by the reverse driven gear 34, it is lower than the rotational speed which would otherwise be increased through the reverse driver gear 31 if the reverse hydraulic clutch 33 were on the second countershaft 7, and the dragging resistance is relatively small. More specifically, the difference between the rotational speeds of the inner discs 33a and the outer discs 33b rotating in the opposite direction is smaller than that of the arrangement in which the reverse hydraulic clutch 33 would otherwise be disposed on the second countershaft 7, since the rotational speed of the inner discs 33a is reduced with respect to that of the second countershaft 7 whereas the rotational speed of the inner discs 33a would be increased with respect to that of the second countershaft 7 for that arrangement.

Since the reverse hydraulic clutch 33 is not mounted on the second countershaft 7, the second countershaft 7 can be positioned as close to the first countershaft 6 as possible, limited only by the size of the reverse driver gear 31 so that it does not interfere with a partition between itself and the auxiliary transmission gear train 10. The reverse hydraulic clutch 33 on the output shaft 8 may be large in diameter without interfering with the auxiliary transmission gear train 10, and hence can have a large torque transmission capacity without increasing the number of clutch discs used. Accordingly, the dimension of the transmission case 54 in the direction in which the transmission shafts are spaced can be reduced without increasing the axial dimension of the portion which stores the main transmission gear train.

We claim:

1. An automotive transmission comprising:
   an input shaft coupled to a coupling device for coupling said input shaft to an engine;
   an output shaft disposed parallel to the input shaft for driving a differential;
   first and second countershafts disposed between said input and output shafts;
   a countershaft type auxiliary transmission gear train with gears on and connecting said input shaft and said first countershaft and having at least two selectable gear trains, said first and second countershafts being connected by normally meshing gears; and
   a countershaft type main transmission gear train with gears on and connecting said second countershaft and said output shaft, said main transmission gear train having a portion positioned laterally of the rotational axis of and axially overlapping and adjacent to the coupling device, said auxiliary transmission gear train being positioned axially adjacent the coupling device.

2. The automotive transmission of claim 1 wherein said main transmission gear train has multiple selectable gear trains for forward operation.

3. The automotive transmission of claim 2 wherein the multiple selectable gear trains for forward operation are all positioned laterally of the rotational axis of and axially overlapping and adjacent to the coupling device.

4. The automotive transmission of claim 1, wherein said reverse gear train is located laterally in a direction perpendicular to the axes of and axially overlapping and adjacent to the auxiliary gear train.

5. The automotive transmission of claim 1 wherein a transmission case includes a front case and a main transmission case, the front case housing the coupling device and the main transmission gear train in an integrally cast unit with the coupling device on an outer side thereof, a portion of the gear trains on said second countershaft and said output shaft being housed in said front case, and the main transmission case housing the remainder of said gear trains and said auxiliary transmission gear train rotatably supported therein, said main transmission case being removably mounted on said front case by bolts.

6. The transmission of claim 1 wherein the coupling device comprises a torque converter.

7. The transmission of claim 1 wherein the coupling device comprises a clutch.

8. An automotive transmission comprising:
   a transmission case having a bottom surface at least part of which is generally oriented in a horizontal plane;
   an input shaft coupled to a coupling device;
   an output shaft disposed parallel to the input shaft for driving a differential;
   first and second countershafts disposed between said input and output shafts;
   an auxiliary transmission gear train connecting said input and said first countershaft, said first and second countershafts being connected by normally meshing gears;
   a main transmission gear train connecting said second countershaft and said output shaft, said main transmission gear training having a portion positioned laterally of the rotational axis of and axially overlapping and adjacent to the coupling device; and
   at least said output shaft and said second countershaft defining a first plane over the transmission case bottom surface, and said input shaft and a center of said differential defining a second plane in between the first plane and the transmission case bottom surface.

9. The automotive transmission of claim 8 wherein said output shaft and said first and second countershafts are disposed above the second plane.

10. An automotive transmission comprising:
    an input shaft coupled to a coupling device;
    an output shaft disposed parallel to the input shaft for driving a differential;
    first and second countershafts disposed between said input and output shafts;
    an auxiliary transmission gear train connecting said input shaft and said first countershaft and having at least two selectable gear trains, said first and second countershafts being connected by normally meshing gears; and
    a main transmission gear train connecting said second countershaft and said output shaft, said main transmission gear train having a portion positioned adjacent and lateral to the coupling device, wherein a reverse gear train is connected between said second countershaft and said output shaft.

11. An automotive transmission comprising:

an input shaft coupled to a coupling device;

an output shaft disposed parallel to the input shaft for driving a differential;

first and second countershafts disposed between said input and output shafts;

an auxiliary transmission gear train connecting said input shaft and said first countershaft, said first and second countershafts being connected by normally meshing gears; and a main transmission gear train connecting said second countershaft and said output shaft, said main transmission gear train having a portion positioned adjacent and lateral to the coupling device, wherein a reverse gear train is connected between said second countershaft and said output shaft and wherein a selectively operable clutch is provided on said output shaft for engaging and disengaging the reverse gear train.

12. An automotive transmission comprising:

an input shaft coupled to a coupling device;

an output shaft disposed parallel to the input shaft for driving a differential;

first and second countershafts disposed between said input and output shafts;

an auxiliary transmission gear train connecting said input shaft and said first countershaft, said first and second countershafts being connected by normally meshing gears; and a main transmission gear train connecting said second countershaft and said output shaft, said main transmission gear train having a portion positioned adjacent and lateral to the coupling device, wherein a reverse gear train is connected between said second countershaft and said output shaft and wherein said reverse gear train is located adjacent and lateral to the auxiliary gear train.

13. An automotive transmission comprising:

a transmission case having a bottom surface at least part of which is generally oriented in a horizontal plane;

an input shaft coupled to a coupling device;

an output shaft disposed parallel to the input shaft for driving a differential;

first and second countershafts disposed between said input and output shafts;

an auxiliary transmission gear train connecting said input shaft and said first countershaft, said first and second countershafts being connected by normally meshing gears; and a main transmission gear train connecting said second countershaft and said output shaft, said main transmission gear train having a portion positioned adjacent and lateral to the coupling device, wherein at least said output shaft and said second countershaft define a first plane over the transmission case bottom surface and, said input shaft and a center of said differential define a second plane in between the first plane and the transmission case bottom surface.

14. An automotive transmission comprising:

a transmission case having a bottom surface at least part of which is generally oriented in a horizontal plane;

an input shaft coupled to a coupling device;

an output shaft disposed parallel to the input shaft for driving a differential;

first and second countershafts disposed between said input and output shafts;

an auxiliary transmission gear train connecting said input shaft and said first countershaft, said first and second countershafts being connected by normally meshing gears; and a main transmission gear train connecting said second countershaft and said output shaft, said main transmission gear train having a portion positioned adjacent and lateral to the coupling device, wherein at least said output shaft and said first and second countershafts are disposed on one side of a plane interconnecting said input shaft and a center of said differential wherein said output shaft and said first and second countershafts are disposed on the same side of a horizontal plane through said input shaft.

15. An automotive transmission comprising:

an input shaft coupled to a coupling device for connecting and disconnecting said input shaft to an engine;

an output shaft disposed parallel to the input shaft for driving a differential;

first and second countershafts disposed between said input and output shafts;

an auxiliary transmission gear train connecting said input shaft and said first countershaft, said first and second countershafts being connected by normally meshing gears;

a main transmission gear train connecting said second countershaft and said output shaft, said main transmission gear train having a portion positioned laterally of the rotational axis of and axially overlapping and adjacent to the coupling device, and a reverse gear train connected between said countershaft and said output shaft.

16. The automotive transmission of claim 15 wherein a selectively operable clutch is provided on said output shaft for engaging and disengaging the reverse gear train.

* * * * *